United States Patent
Aden et al.

(10) Patent No.: US 10,210,106 B2
(45) Date of Patent: Feb. 19, 2019

(54) CONFIGURABLE HARDWARE QUEUE MANAGEMENT

(71) Applicant: International Business Machines Corporation, Armonk, NY (US)

(72) Inventors: Steven G. Aden, Simpsonville, SC (US); Clinton E. Bubb, Pleasant Valley, NY (US); Michael Grassi, Shokan, NY (US); Howard M. Haynie, Wappingers Falls, NY (US); Raymond M. Higgs, Poughkeepsie, NY (US); Luke M. Hopkins, Peterborough, NH (US); Kirk Pospesel, Yorktown, NY (US); Gabriel M. Tarr, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/459,612

(22) Filed: Mar. 15, 2017

(65) Prior Publication Data
US 2018/0267909 A1    Sep. 20, 2018

(51) Int. Cl.
*G06F 12/0813* (2016.01)
*G06F 13/16* (2006.01)

(52) U.S. Cl.
CPC ...... *G06F 13/1642* (2013.01); *G06F 13/1663* (2013.01); *G06F 13/1668* (2013.01); *G06F 12/0813* (2013.01)

(58) Field of Classification Search
None
See application file for complete search history.

(56) References Cited

U.S. PATENT DOCUMENTS

| 5,519,701 | A |   | 5/1996 | Coulmant et al. |
| 6,088,740 | A | * | 7/2000 | Ghaffari ............ G06F 9/3879 710/112 |

(Continued)

OTHER PUBLICATIONS

Sathe, Satish; "Hardware-Based Virtualization Eases Design With Multicore Processors"; Jan. 20, 2011; Retrieved from the internet:, URL:http://http://www.edn.com/design/systems-design/4363945/Hardware-based-virtualization-eases-design-with-multicore-processors-4363945, 7 pages.

*Primary Examiner* — Brian R Peugh
(74) *Attorney, Agent, or Firm* — Cantor Colburn LLP; Steven Chiu

(57) ABSTRACT

A system for managing one or more queues in a multi-processor environment includes a queue manager disposed in communication with a plurality of processors and a memory shared by the plurality of processors, and a queue configured to be controlled by the queue manager, the queue including independent and discrete queue elements and having a starting location specified by a base address, the queue manager having one or more dynamically configurable parameters, the one or more dynamically configurable parameters including a size of each of the queue elements. The queue manager is configured to perform receiving a message from a processor of the plurality of processors, the message including an operation address specifying a fixed storage location in the memory and a request related to accessing the memory, selecting the queue based on the operation address, and performing a queuing operation on the queue based on the request.

17 Claims, 3 Drawing Sheets

(56) References Cited

U.S. PATENT DOCUMENTS

| | | | |
|---|---|---|---|
| 6,219,728 B1* | 4/2001 | Yin | H04L 12/5601 |
| | | | 370/229 |
| 8,286,188 B1* | 10/2012 | Brief | G06F 9/544 |
| | | | 719/312 |
| 2002/0126673 A1* | 9/2002 | Dagli | H04L 47/10 |
| | | | 370/392 |
| 2002/0129213 A1 | 9/2002 | Goudie et al. | |
| 2004/0139284 A1* | 7/2004 | Clayton | G06F 9/5016 |
| | | | 711/147 |
| 2005/0147038 A1 | 7/2005 | Chandra et al. | |

* cited by examiner

CONFIGURABLE HARDWARE QUEUE MANAGEMENT

BACKGROUND

The present invention relates generally to multi-processor technology, and more specifically, to queue management in a multi-processor environment.

Multi-processor or parallel-processor designs are increasingly utilized for their ability to improve computing speeds, performance, and reliability relative to single processor designs. A multi-processor system includes multiple independent processors, which can execute multiple instructions in parallel, substantially increasing processing speed.

Although multi-processor systems typically enhance the performance of a computer system, the multiple processors also create technical problems, such as managing multiple processors accessing a shared memory at the same time. Orchestration of activity between multiple processors is frequently achieved using queues stored in a common memory space. Processors generally must inspect the queues and/or communicate with other processors to avoid conflicts due to multiple processors accessing a queue.

SUMMARY

Embodiments include a method, system, and computer program product for monitoring participants in a group. In one embodiment, a system for managing one or more queues in a multi-processor environment includes a queue manager disposed in communication with a plurality of processors in the multi-processor environment and a memory shared by the plurality of processors, and a queue configured to be controlled by the queue manager, the queue including independent and discrete queue elements and having a starting location specified by a base address, the queue manager having one or more dynamically configurable parameters, the one or more dynamically configurable parameters including a size of each of the queue elements. The queue manager is configured to perform receiving a message from a processor of the plurality of processors, the message including an operation address specifying a fixed storage location in the memory and a request related to accessing the memory, selecting the queue based on the operation address, and performing a queuing operation on the queue based on the request.

In another embodiment, a computer implemented method of managing one or more queues in a multi-processor environment includes receiving a message at a queue manager from a processor, the processor being one of a plurality of processors in the multi-processor environment, the message including an operation address specifying a fixed storage location in a memory shared by the plurality of processors and a request related to accessing the memory. The method also includes selecting, by the queue manager, a queue stored in the memory, the queue configured to be controlled by the queue manager and including independent and discrete queue elements, the queue manager having one or more dynamically configurable parameters, the one or more dynamically configurable parameters including a size of each of the queue elements, and performing a queuing operation on the queue based on the operation address and the request.

In a further embodiment, a computer program product for managing one or more queues in a multi-processor environment includes a computer readable storage medium having program instructions embodied therewith, the program instructions executable by a processor to cause the processor to perform a method that includes receiving a message at a queue manager from a processor, the processor being one of a plurality of processors in the multi-processor environment, the message including an operation address specifying a fixed storage location in a memory shared by the plurality of processors and a request related to accessing the memory. The method also includes selecting, by the queue manager, a queue stored in the memory, the queue configured to be controlled by the queue manager and including independent and discrete queue elements, the queue manager having one or more dynamically configurable parameters, the one or more dynamically configurable parameters including a size of each of the queue elements, and performing a queuing operation on the queue based on the operation address and the request.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter of the present disclosure is particularly pointed out and distinctly claimed in the claims at the conclusion of the specification. The foregoing and other features and advantages of the one or more embodiments disclosed herein are apparent from the following detailed description taken in conjunction with the accompanying drawings, in which:

DETAILED DESCRIPTION

There are provided methods, devices, systems and computer program products for managing multi-processor computing operations related to accessing a shared memory. An embodiment of a multi-processor system includes a hardware queue manager configured to intercept communications, requests or instructions from one or more processors in the system and perform queuing operations. The queue manager is dynamically configurable, allowing for parameters such as queue element size, queue length and queuing behavior to be changed at any time. The queue manager relieves the processors of having to perform various queuing operations and ensures that multiple processors can safely operate on any queue simultaneously or otherwise, without requiring the processors to first inspect the queues to avoid conflicts or overruns.

In one embodiment, the queue manager is configured to designate one or more fixed storage locations associated with different queuing operations and allows a processor to request a queuing operation by writing to or reading from an associated fixed memory location. This embodiment allows a processor to request a queuing operation by specifying an operation address without having to update metadata or otherwise perform burdensome operations.

Figure 1:
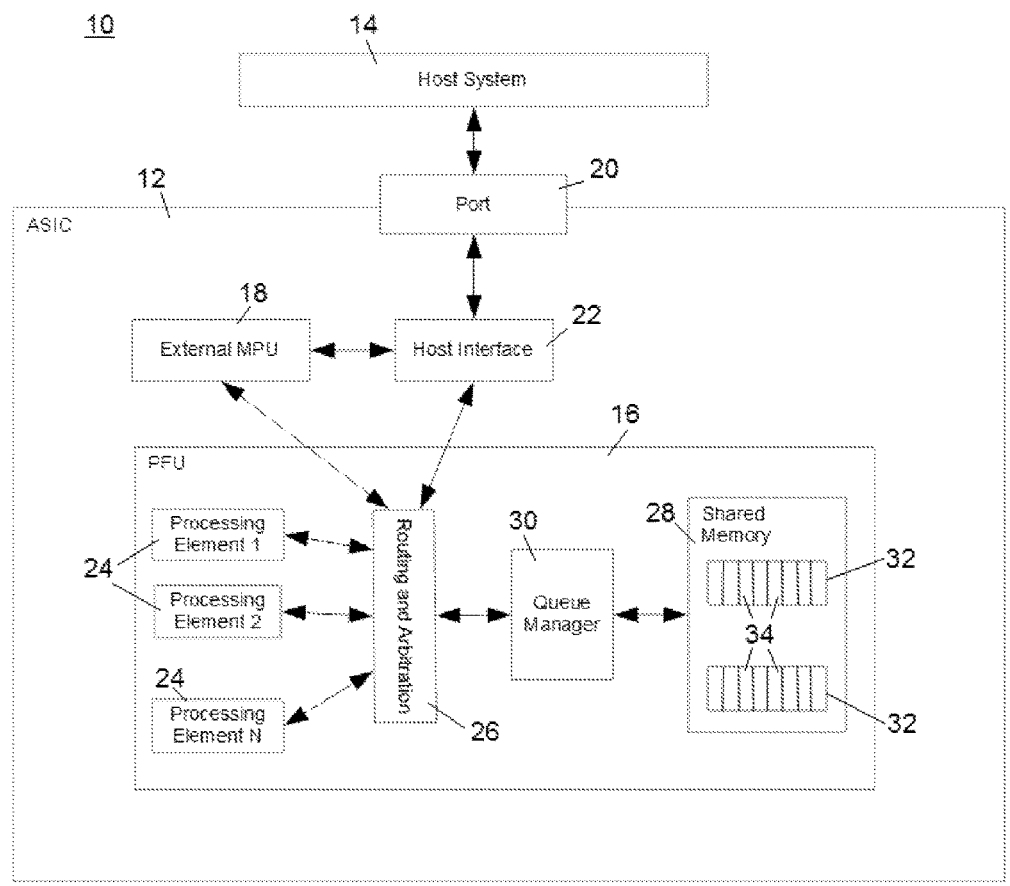
FIG. 1 depicts a multi-processor computing system according to one or more embodiments of the present invention.

FIG. 1 depicts a multi-processor computing system 10 according to an embodiment of the present invention. The computing system 10 can be used to perform various actions, including receiving and processing user inputs and performing various processing actions as described herein, including storing and processing data, executing programs and displaying information. The computing system 10 may be used in a server computer, a desktop computer, a laptop computer, a tablet computer, a smartphone, or any other computing system.

The computing system 10 includes a hardware device 12 that is connected to a host processing system 14. Examples of the hardware device include storage cards and I/O cards such as network or modem cards. The hardware device 12 may be connected via any suitable communication link, such as a peripheral component interconnect (PCI) link or a peripheral component interconnect express (PCIe) link. The host processing system 14 may be any suitable computer processing system, including distributed computer processing systems and mainframe computer processing systems such as a z/Architecture system by IBM®.

The hardware device 12 includes a programmable function unit (PFU) 16 that may be connected to various devices and components on the hardware device and/or external devices. For example, the PFU 16 is communicatively connected to components of the hardware device 12 such as a multi-processor unit (MPU) 18 that includes multiple processors (e.g., processing cores). Each processor may be a central processing unit, an application-specific integrated circuit (ASIC), a digital signal processor, a field programmable gate array (FPGA), a digital circuit, an analog circuit, or combinations thereof. The hardware device 12 is not limited to the embodiment shown in FIG. 1, and may have different configurations and include various functional units or other components.

The PFU 16 may also be communicatively connected to devices or components external to the hardware device 12. For example, the PFU 16 can be connected to the host system 14 by interface and/or communication components such as a port 20 and an interface 22. The PFU 16 includes hardware logic and other components such as multiple processing elements 24, a routing and arbitration unit 26 and a shared memory 28.

The shared memory 28 can be accessed by the processing elements 24 via a hardware queue manager 30. The hardware queue manager 30 is a programmable or configurable hardware component that can be formed on the hardware device 12 (e.g., on an ASIC chip) or formed on another component or location of the hardware device 12. The queue manager 30 includes a control circuit or other suitable logic for processing requests from each processing element 24 and performing operations relating to queues used to access the shared memory 28, such as enqueuing, dequeuing, snooping (or peeking) and queue management operations.

It is noted that the number, type and/or configuration of the processing elements and other components of the computing system are not limited to that described herein. For example, the processing elements may include processing elements at other locations, such as processing cores in the MPU (and/or processing elements therein), processors at other locations on the hardware device 12 and external processing devices (e.g., in the host system).

The queue manager 30 includes or is connected to one or more queues 32 stored in the shared memory 28. Each queue 32 may be any suitable type, such as first-in-first-out (FIFO) or last-in-first-out (LIFO) queue, and can be configured for different purposes. For example, the queues 32 can include one or more command queues, receive queues, send queues and/or logging queues. Each queue includes discrete queue elements 34, which can be dynamically configured as discussed further below. Each queue element 34 may be independently accessible as a discrete element. In one embodiment, the queues 32 are hardware queues located within the PFU 28 or disposed at another location (e.g., on the hardware device 12 and/or the MPU 16) and operably connected to the queue manager 30.

The queue manager 30 relieves processing elements from performing various queuing operations involved in processing data and communication. From the view of the processing elements in the system, access to the shared memory 28 is transparent, aside from well-defined locations that trigger queuing operations discussed further below. Thus, it appears to the processing elements that they can access the shared memory 28 directly, and can request access to the queues 32 in the shard memory 28 without having to coordinate with other processing elements accessing the shared memory 28. Processing elements can thereby simultaneously request access, as the queue manager 30 handles actual queuing and coordinating reading to and writing from the queues 32.

Figure 2:
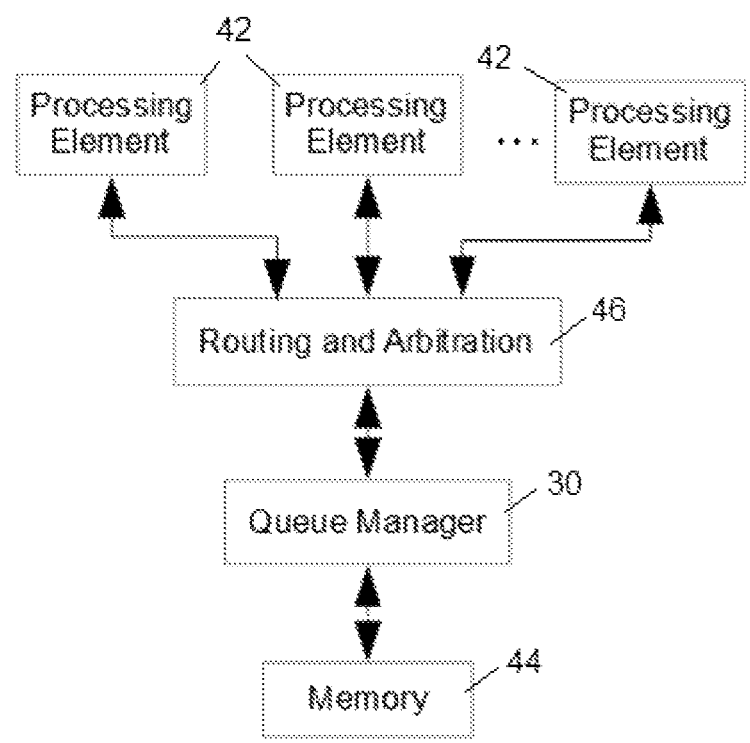
FIG. 2 is a block diagram that illustrates aspects of the functionality of a queue manager according to one or more embodiments of the present invention.

FIG. 2 is a block diagram that illustrates aspects of an embodiment of a multi-processor environment and the functionality of the queue manager 30. A plurality of individual processing elements 42 are communicatively connected to a memory 44 that is independently accessible by each processing element. The memory 44 may be the shared memory 28 or any other memory that is shared by multiple processing elements. As shown, each processing element 42 can individually and independently issue instructions (e.g., read and/or write instructions) to the memory 44 according to programmed routing and arbitration rules 46. Each memory reference is transmitted from a processing element 42 and is intercepted by the queue manager 30.

The queue manager 30 in this embodiment is a block of logic which is distinct from the memory 44 and is interposed between the processing elements and the shared memory. The queue manager 30 intercepts requests to a particular memory address and handles queuing operations without requiring processors to check individual queues or perform queuing operations, which reduces overhead and processing loads on the processors. For example, the queue manager 30 can perform functions such as determining specific queues or queue elements for reading or writing, updating queues, address translation and maintenance and logging of queues.

Any processing element (e.g., the processing element 24 and/or processing element 42) may request a read or write operation at any time without having to actively check memory locations or queues, as the hardware queue manager 30 performs various queuing operations involved in executing read and write operations. In one embodiment, a processing element can send a single load or store operation to write data into a queue or read data from a queue, as the queue manager handles all of the functions needed to execute the operation.

For example, the requesting processing element can request a read or write by specifying only an address in memory of a queue, e.g., a read queue or a write queue, or an address associated with a specific type of queuing operation. For example, the queue manager 30 designates specific addresses in the shared memory (referred to as operation addresses), that can be specified by the processing element to request an operation. The queue manager 30 then performs functions to check the queue, determine which queue elements are available and the location of such elements, enqueue to or dequeue from a queue, update queue status, and perform logging functions. In this way, the processing element need only indicate an operation address associated with an operation (e.g., reading or writing), as the queue manager 30 reduces the processing load on the processing element and shields programmers from all of the overhead associated with queuing. In addition, the queue manager 30 allows for writing to or reading from a fixed address without having to update metadata.

The hardware queue manager 30 handles queuing operations and consolidates aspects of the operations, including determining whether a queue full condition exists, inspecting queues, configuring queues, launching dequeues and launching enqueues. By performing these distinct operations, the queue manager is able to relieve the processing elements from having to perform these functions and can allow the processing elements to check for queue full conditions without having to directly inspect the queues. For example, a processing element can request enqueue or dequeue from a shared queue without having to first check with other processing elements to avoid conflicts or overruns.

The queue manager 30 may be dynamically configurable so that parameters of the queue manager's behavior and/or parameters of individual queues and queue elements can be adjusted or changed at any desired time after initial assembly or initial configuration. For example, the queue manager 30 can be configured to set the size of independent discrete queue elements in the queue (e.g., queue elements 34), allow for performing different types of queuing operations (e.g., enqueuing to the head of a queue instead of the tail, to set a queue full threshold, peeking at an element at the tail of a queue without dequeuing from the queue, etc.), and/or provide the ability to dequeue or enqueue multiple elements at a time.

The queue manager 30 can store configuration parameters at any suitable location that is accessible to the queue manager 30. For example, the queue manager 30 may include hardware registers (e.g., configuration registers), indexed to each queue 32, that stores configuration parameters. Parameters that can be stored (and changed dynamically) include queue type (e.g., FIFO or LIFO), whether writing to a full queue is allowed, a queue full threshold (e.g., maximum number of queue entries), queue width (size of individual queue elements), and queue depth (total number of queue elements).

The queue manager configuration is dynamic as the configuration is not permanently written into the queue manager but can be changed as desired after initial configuration. The configuration may be changed by a user via any suitable mechanism, such as a software interface to the queue manager. For example, a user can reconfigure parameters of one or more queues such as queue length and queue element size, e.g., to accommodate new communication protocols.

The following are examples of parameters of queues and/or the queue manager 30 that can be configured at the time of initial configuration or at any suitable time thereafter. Some examples of configurable parameters include queue type (e.g., LIFO or FIFO), the number of queue elements in a queue, the size of each queue element in a queue, and the base address of queue element storage (e.g., the starting address of each queue).

Other parameters that can be dynamically set or changed include the behavior of the queue manager 30 when attempting to enqueue to a full queue or dequeue from an empty queue or queue element. For example, the queue manager 30 can be configured to allow an error to be raised or data to be overwritten when enqueuing to a full queue. The queue manager 30 can also be configured to return an empty sentinel or other indication that is returned when a dequeue is executed against an empty queue. When reading more data than there are elements in a queue, the queue manager 30 can be configured to return the empty sentinel as many times as necessary to satisfy the size of the read operation. Another parameter that can be configured is a "queue full" threshold that permits adjustment of when a queue full condition is indicated.

In one embodiment, the hardware queue manager 30 is configured to store addresses of memory locations that can be associated with different queuing operations. Such addresses may include base addresses of queues and/or addresses of fixed storage locations that trigger or describe specific types of queuing actions to be taken. Such addresses may be referred to herein as operation addresses. The operation addresses can be configurable to, e.g., specify the memory locations at which queuing operation descriptions are located, specify or change the type of operation associated with a given location, remove queuing operation descriptions from a location and/or add queuing operation descriptions to a location.

The storage locations of the queue elements themselves may be disjointed from the operation addresses used for controlling queue operations. This permits logging the queue without activating any queue operations.

In one embodiment, the queue manager 30 stores queuing operation information at fixed storage locations to allow a processing element to request or instruct a specific type of queuing operation by specifying a fixed storage location. The queue manager 30 may be configured to specify fixed storage locations associated with different queuing operations such as enqueuing, dequeuing and peeking at a queue. A processor can request a specific type of operation by specifying the corresponding operation address.

For example, the queue manager 30 can store an enqueue operation address associated with an enqueue operation, which allows a processing element to enqueue a data element (e.g., a packet) to a queue by writing the data element to the enqueue operation address. Likewise, the queue manager 30 can store a dequeue operation address associated with a dequeue operation, which allows a processing element to dequeue a data element (e.g., a packet) from a queue by reading the data element from the dequeue operation address. In this way, the processor can read or write to or from a fixed address without having to update metadata (e.g., in and out pointers). In addition, a processing element can specify the enqueue or dequeue of multiple elements in one operation.

The operation addresses can be set so that they can be read from or written to perform different queuing operations, such as peeking at a queue, peeking at individual queue elements, enqueuing to specific queue elements and dequeuing from specific queue elements. Examples of queuing operations that can be specified by respective addresses include:

a) Enqueue one or more elements to the tail of a queue;
b) Dequeue one or more elements from the head of a queue;
c) Enqueue one or more elements to the head of a queue;
d) Dequeue one or more elements from the tail of a queue;
e) Peek at the head of a queue, which does not cause a dequeue to occur but returns the element at the head; and
f) Peek at the tail, which does not cause a dequeue to occur but returns the element at the tail.

The following table shows an example of operation addresses that can be set by the queue manager and dynamically configured. Operation addresses can be stored as a table, in registers or at any other suitable location or as any suitable data structure. In this example, all of the operation addresses for a queue are set as contiguous in memory. The operation addresses may begin at an address that is sufficiently aligned, so as not to cause an alignment exception. The following table shows various addresses in memory of continuous storage locations associated with different queuing operations. The storage locations may have any selected length (e.g., a multiple of 4 bytes). The start address of the operation addresses is denoted as "K".

| Action | Address | Operation | Size of Transfer |
|---|---|---|---|
| Enqueue to the Tail | K | Write | Elm Size * num_elm to enqueue |
| Dequeue from the Head | K + 4 | Read | Elm Size * max_num_elm to dequeue |
| Enqueue to the Head | K + 8 | Write | Elm Size * num_elm to enqueue |
| Dequeue from the Tail | K + 12 | Read | Elm Size * max_num_elm to dequeue |
| Peek at the Head | K + 16 | Read | Element size |
| Peek at the Tail | K + 20 | Read | Element size |

In the above table, "Elm Size" refers to the size of an element for which the operation is performed, "num_elm to enqueue" refers to the number of elements to be enqueued, and "num_elm to dequeue" refers to the number of elements to be dequeued. "max_num_elm to dequeue" refers to the maximum number of elements that can be dequeued, and "max_num_elm to enqueue" refers to the maximum number of elements that can be enqueued.

In one embodiment, the queue manager 30 is configured to provide one or more indicators of the status of each queue 32. Each of the indicators can be stored, e.g., in respective hardware registers in the queue manager 30 and indexed to each queue 32, which allow the queue manager 30 to set a value of the indicator. An indicator may be returned to a requesting processing element to inform the processing element of queue status. For example, the queue manager 30 can maintain indicators for queue statuses such as queue full, queue empty and current queue element count. Indicators may be transmitted to processing elements in response to processing element requests or broadcast to one or more processing elements if the status of a queue or queues changes.

Figure 3:
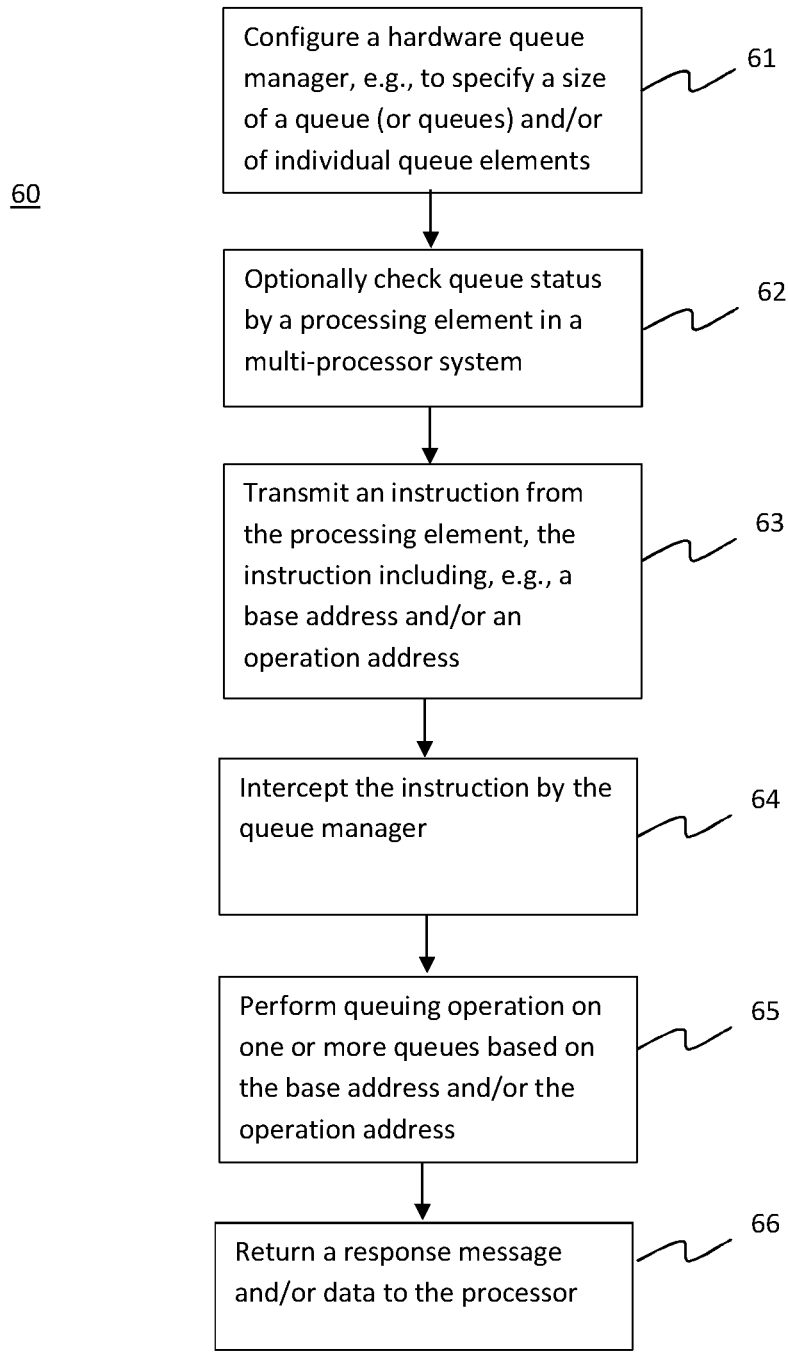
FIG. 3 is a flow diagram depicting an embodiment of a method of performing a computing operation that includes accessing a shared memory by one or more processors in a multi-processor environment.

FIG. 3 is a flow diagram depicting an embodiment of a method 60 of performing a computing operation that includes accessing a shared memory by one or more processors in a multi-processor environment. The method 60 includes a number of steps or stages represented by blocks 61-66. One or more embodiments are described in conjunction with the computing system and/or the hardware queue manager 30, but the embodiments are not so limited. One or more embodiments include the execution of all of the steps shown in blocks 61-66 in the order described. However, certain steps may be omitted, steps may be added, or the order of the steps changed.

In the first stage 61, a hardware queue manager such as the queue manager 30 of FIG. 1 is initially configured according to an initial configuration. The configuration specifies parameters of the queue manager, such as a number of queues, types of queues, queue length and size of queue elements. Other parameters include, for example, whether the queue manager will raise an error or overwrite queue element(s) if there is a queue full condition. The configuration of the queue(s) and/or queue manager may be changed after the initial configuration as required, e.g., to accommodate different packet or message sizes.

Optionally, in the second stage 62, prior to transmitting a request to a queue in shared memory, a processing element in a multi-processor system (e.g., a processing element 24) performs a check to determine the status of the queue. For example, the processing element checks the queue to determine whether the queue is full, or whether the queue is empty. The queue status may be checked based on indicators stored in the processing element (e.g., in one or more hardware registers).

If the processing element receives an instruction that includes or requires an enqueue to a queue, the processing element can check whether a queue full indicator stored in the processing element (e.g, a queue full status register in the processing element) for the queue has been set. If the queue full indicator is set (indicating that there is a queue full condition), the processing element does not execute the instruction, or waits until the queue manager indicates that the queue is no longer full. Alternatively, if overwriting the queue is allowed (e.g., as indicated in the configuration register in the queue manager), the processing element can overwrite one or more elements in the queue via the queue manager.

Likewise, if the instruction includes or requires a dequeue of a queue, the processing element can check whether a queue valid or not-empty indicator (e.g, a queue valid status register in the processing element) has been set. If the queue valid indicator has been set (indicating that the queue is not empty), the processing element can proceed with the dequeue. Otherwise, the processing element does not transmit the dequeue request or waits until the queue is no longer empty. The queue full indicator and the queue valid indicator may be stored in registers in each processing element. It is noted that once the processing element checks the queue status via an indicator stored in the processing element and requests an enqueue or dequeue, the processing element does not need to perform any further queuing operations; the actual enqueuing or dequeuing is executed by the queue manager.

In one embodiment, a processing element can receive a "wait event" instruction, which directs the processing element to wait until a selected condition is met. For example, the processing element can be instructed to wait until a queue is valid (i.e., not empty) before dequeuing, or wait until a queue has sufficient free space (i.e., is not full) before enqueuing. The wait event instruction may be executed by the processing element in conjunction with the indicators discussed above.

In the third stage 63, the processing element transmits a message including a request and/or data to a shared memory (e.g., the memory 28) to perform an operation. For example, the processing element transmits a message that includes a read request for data stored in the shared memory, or that includes a write request and associated data for storing the data in the shared memory. The message may include a request to load data to a specific queue or a request to store data in a specific queue.

In one embodiment, a message issued by the processor includes an operation address associated with a requested operation. The operation address may be a base address or other address indicating a start location of a requested queue (e.g., a command queue or a write queue) or a specified location that triggers a specific type of operation. For example, the message specifies a base address of a queue and a request to load from (or read from) the queue for a dequeue operation, or a request to store to (or write to) the queue for an enqueue operation. The processor does not need to specify any further information regarding the queue(s) to be used.

In one embodiment, the request from the processing element specifies a type of operation to be performed on a queue by indicating an operation address stored by the queue manager. For example, the message can specify an operation address that causes the queue manager to perform an operation such as a peek operation or an enqueue or dequeue from a specific queue element (e.g., the tail of a queue).

In the fourth stage 64, the queue manager intercepts the message and processes the request(s) therein.

In the fifth stage 65, the queue manager identifies the queue to be used based on the operation address and performs various queuing operations, such as determining whether the queue is full, locating free queue elements and writing data to or reading data from the identified queue. The queuing operations may also include collecting or aggregating information regarding queue use (e.g., by logging).

For example, the queue manager performs an enqueue to a queue if the request specifies a write to a base address, or performs a dequeue from the queue if the request specifies a read from a base address. In another example, the queue manager performs a peak, enqueue to the head of a queue or other type of operation based on the operation address. If the queue manager determines that there is a queue full condition, the queue manager can either raise an error or overwrite the next entry.

In one embodiment, the queue manager maintains the status of each queue and transmits an indicator or other communication to indicate the status of a queue when the status changes. For example, if a queue becomes full, the queue manager can send a queue full indicator to each processing element. If a queue becomes empty, the queue manager can send a queue empty indicator (e.g., send a signal to cause a queue valid indicator in the processing element to be set to zero), or if a queue is written to, causing the queue to go from an empty to a not-empty condition, the queue manager can send an appropriate indicator (e.g., send a signal to cause the queue valid indicator to be set to one).

In one example, if the status of a queue changes, the queue manager can send a signal to cause appropriate indicators maintained in processing element registers to be set. For example, the queue manager can set or change status indicators such as queue full indicators and queue valid indicators in processing element registers. This allows each processing element to quickly check the status of a queue (e.g., in one clock cycle) before executing an instruction or sending a request to the shared memory.

In the sixth stage 66, the queue manager transmits a response to the requesting processor. The response may include data read from the memory, and indication that data was read into the memory and other information relevant to the operation.

It is noted that aspects of the method 60 may be performed based on messages or instructions transmitted in parallel from multiple processors. Each processor can transmit a message without having to coordinate with other processors, but instead can simply transmit the message with a base address and/or an operation address.

Technical effects and benefits include the ability to facilitate communications and transfers between processors and a shared memory in a multi-processor environment. Embodiments of a hardware queue manager described herein increase the performance of multi-processor computing systems and components by relieving individual processors of the need to, e.g., synchronize with other processors or update queue metadata when performing queuing operations. The embodiments also allow multiple processors to simultaneously transmit data and requests to shared memory without having to be concerned with conflicts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for managing one or more queues in a multi-processor environment, the system comprising:
    a queue manager disposed in communication with a plurality of processors in the multi-processor environment and a memory shared by the plurality of processors; and
    a queue configured to be controlled by the queue manager, the queue including independent and discrete queue elements and having a starting location specified by a base address, the queue manager having one or more dynamically configurable parameters, the one or more dynamically configurable parameters including a size of each of the queue elements, the queue manager configured to perform:
    receiving a message from a processor of the plurality of processors, the message including an operation address specifying a fixed storage location in the memory and a request related to accessing the memory;
    selecting the queue based on the operation address; and
    performing a queuing operation on the queue based on the request wherein the fixed storage location includes a description of an action to be performed on the queue.

2. The system of claim 1, wherein the queue manager is a hardware component disposed at a communication path between the plurality of processors and the shared memory.

3. The system of claim 1, wherein the operation address is a base address of the queue, and the request is a request to write to the queue or a request to read from the queue.

4. The system of claim 1, wherein performing the queueing operation includes performing the action on the queue as described at the fixed storage location.

5. The system of claim 1, wherein the fixed storage location is one of a plurality of contiguous storage locations, each of the plurality of contiguous storage locations describing a different action.

6. The system of claim 1, wherein the action includes at least one of: enqueuing one or more elements to a tail of the queue, dequeuing one or more elements from a head of the queue, enqueuing one or more elements to the head of the queue, and dequeuing one or more elements from the tail of the queue.

7. The system of claim 1, wherein the action includes at least one of: peeking at a head of the queue, and peeking at a tail of the queue.

8. A computer implemented method of managing one or more queues in a multi-processor environment, the method comprising:
   receiving a message at a queue manager from a processor, the processor being one of a plurality of processors in the multi-processor environment, the message including an operation address specifying a fixed storage location in a memory shared by the plurality of processors and a request related to accessing the memory,
   selecting, by the queue manager, a queue stored in the memory, the queue configured to be controlled by the queue manager and including independent and discrete queue elements, the queue manager having one or more dynamically configurable parameters, the one or more dynamically configurable parameters including a size of each of the queue elements; and
   performing a queuing operation on the queue based on the operation address and the request, wherein performing the queueing operation includes performing an action on the queue as described at the fixed storage location specified by the operation address.

9. The method of claim 8, wherein the queue manager is a hardware component disposed at a communication path between the plurality of processors and the shared memory.

10. The method of claim 8, wherein the operation address is a base address of the queue, and the request is a request to write to the queue or a request to read from the queue.

11. The method of claim 10, wherein the fixed storage location is one of a plurality of contiguous storage locations, each of the plurality of contiguous storage locations describing one of a plurality of different actions.

12. The method of claim 11, wherein the request specifies a desired action of the plurality of different queueing actions by reading from or writing to one of the fixed storage locations.

13. The method of claim 11, wherein the plurality of different actions includes at least one of: enqueuing one or more elements to a tail of the queue, dequeuing one or more elements from a head of the queue, enqueuing one or more elements to the head of the queue, and dequeuing one or more elements from the tail of the queue.

14. The method of claim 11, wherein the plurality of different actions includes at least one of: peeking at a head of the queue, and peeking at a tail of the queue.

15. A computer program product for managing one or more queues in a multi-processor environment, the computer program product comprising a computer readable storage medium having program instructions embodied therewith, the program instructions executable by a processor to cause the processor to perform a method comprising:
   receiving a message at a queue manager from a processor, the processor being one of a plurality of processors in the multi-processor environment, the message including an operation address specifying a fixed storage location in a memory shared by the plurality of processors and a request related to accessing the memory,
   selecting, by the queue manager, a queue stored in the memory, the queue configured to be controlled by the queue manager and including independent and discrete queue elements, the queue manager having one or more dynamically configurable parameters, the one or more dynamically configurable parameters including a size of each of the queue elements; and
   performing a queuing operation on the queue based on the operation address and the request, wherein the fixed storage location includes a description of an action to be performed on the queue, the fixed storage location being dynamically configurable.

16. The computer program product of claim 15, wherein the queue manager is a hardware component disposed at a communication path between the plurality of processors and the shared memory.

17. The computer program product of claim 15, wherein the fixed storage location is one of a plurality of contiguous storage locations, each of the plurality of contiguous storage locations describing one of a plurality of different actions.

\* \* \* \* \*